United States Patent [19]

Campbell et al.

[11] Patent Number: 4,498,732
[45] Date of Patent: Feb. 12, 1985

[54] FIBER OPTIC SPLICE ORGANIZER

[75] Inventors: Bruce D. Campbell, Portola Valley; Vernon A. Fentress, Castro Valley, both of Calif.

[73] Assignee: Raychem Corporation, Menlo Park, Calif.

[21] Appl. No.: 381,825

[22] Filed: May 25, 1982

Related U.S. Application Data

[63] Continuation-in-part of Ser. No. 339,275, Jan. 15, 1982, abandoned.

[51] Int. Cl.³ .............................................. G02B 7/26
[52] U.S. Cl. ................................................ 350/96.20
[58] Field of Search .................... 350/96.20, 96.21

[56] References Cited

U.S. PATENT DOCUMENTS

| 3,455,336 | 7/1969 | Ellis | 138/156 |
|---|---|---|---|
| 4,177,446 | 12/1979 | Diaz | 338/212 |
| 4,223,209 | 9/1980 | Diaz | 219/549 |
| 4,266,853 | 5/1981 | Hutchins et al. | 350/96.20 |
| 4,373,777 | 2/1983 | Borsuk et al. | 350/96.20 |

FOREIGN PATENT DOCUMENTS

| 3006131 | 9/1981 | Fed. Rep. of Germany | 350/96.20 |
|---|---|---|---|
| 13346 | 2/1977 | Japan | 350/96.21 |
| 62415 | 5/1980 | Japan | 350/96.20 |
| 84905 | 6/1980 | Japan | 350/96.20 |
| 100504 | 7/1980 | Japan | 350/96.20 |
| 127508 | 10/1980 | Japan | 350/96.20 |
| 127507 | 10/1980 | Japan | 350/96.20 |

Primary Examiner—William L. Sikes
Assistant Examiner—Frank González
Attorney, Agent, or Firm—Herbert G. Burkard; T. Gene Dillahunty; Dennis E. Kovach

[57] ABSTRACT

A method and device for organizing a bight of an optical fiber and the like at a splice or slack point is provided. The method comprises wrapping the bight about a cylindrical core to form a helix or a pair of helices of opposite handedness, thereby both minimizing the diameter of a container necessary to enclose that bight and maximizing the bend radius of the fiber. The bight may be laid on a sheet for convenient wrapping, and a plurality of fibers per sheet, sheets per core, or cores per splice may be used if the number of fibers to be organized is large. A ready means of encapsulation is also provided.

29 Claims, 6 Drawing Figures

U.S. Patent Feb. 12, 1985 Sheet 1 of 2 4,498,732
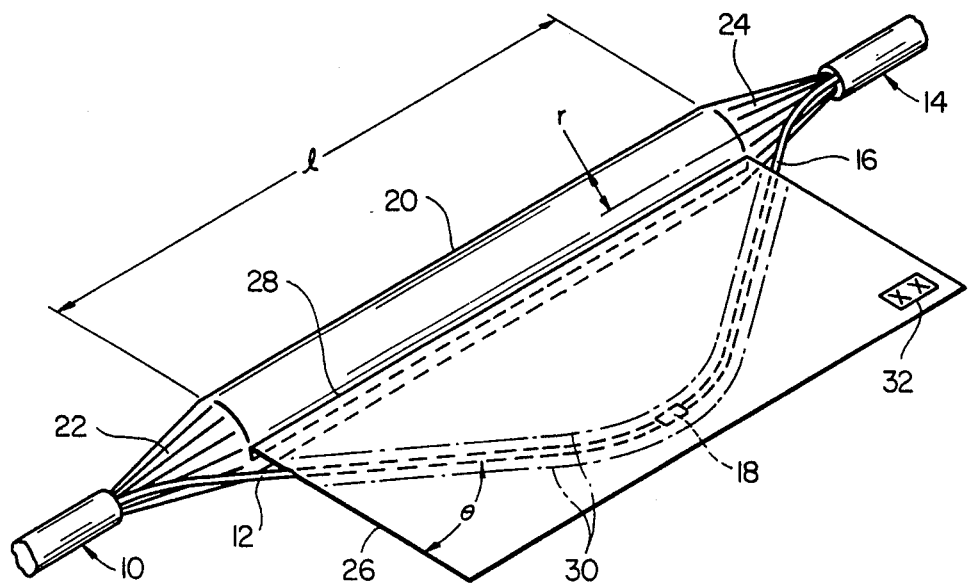
FIG_1
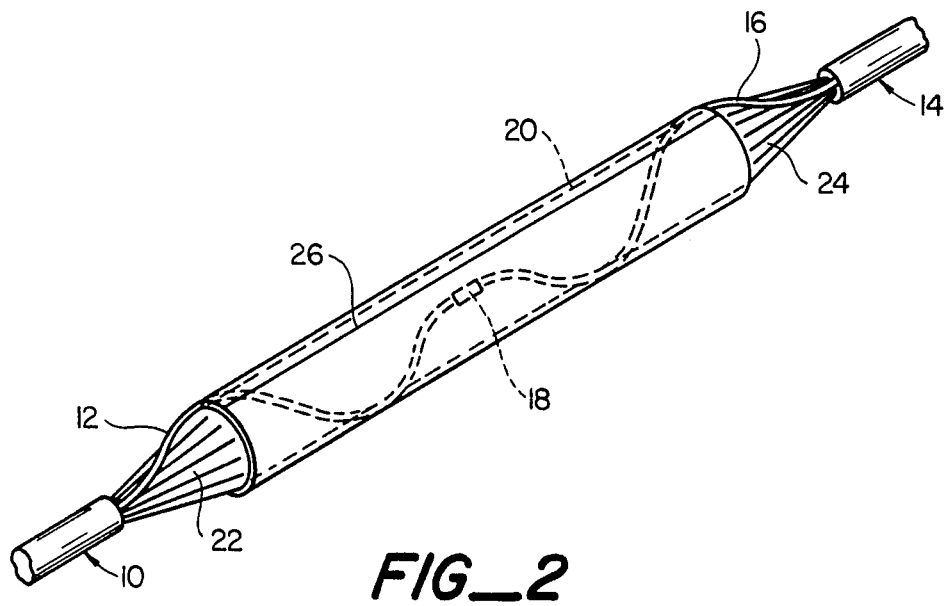
FIG_2

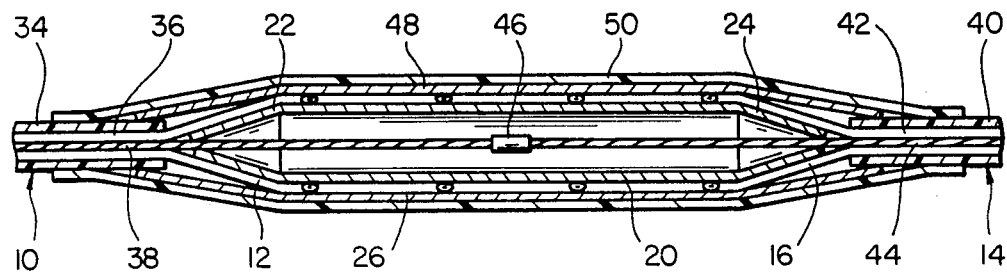
FIG_3
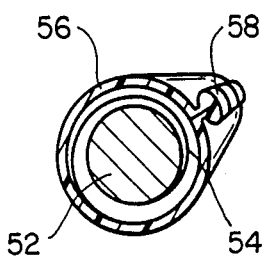
FIG_4
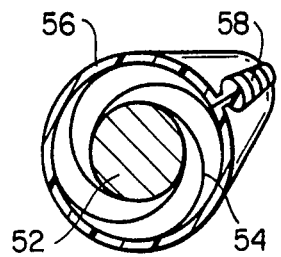
FIG_5
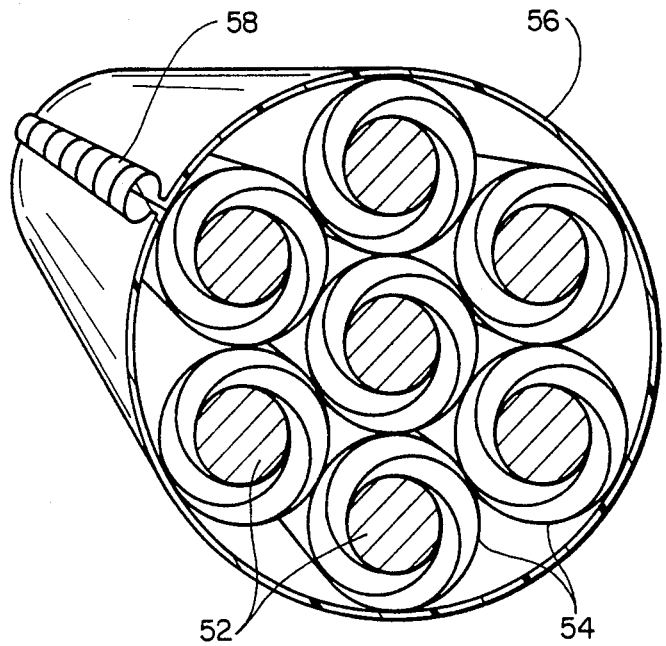
FIG_6

FIBER OPTIC SPLICE ORGANIZER

CROSS-REFERENCE TO RELATED APPLICATION

This application is a continuation-in-part of our related application Ser. No. 339,275 filed Jan. 15, 1982, now abandoned, which is incorporated herein by reference.

BACKGROUND OF THE INVENTION

1. Field of the Invention

This invention relates to a device and method for organizing optical fibers and the like at splice or slack points, and to the joining of fiber optic cables.

2. Summary of the Prior Art

The handling of optical fibers requires special care. This is particularly true in splice enclosures. Due to their size, which can be as small as 0.2 mm in diameter, the handling of fibers is a problem. Transmission capabilities will be impaired if a fiber is bent beyond the critical radius, the point at which light is no longer totally contained in the core of the fiber. Furthermore, fibers are brittle and will break if bent beyond a minimum bending radius. The minimum bending radius here refers to that radius below which the probability of breakage of the fiber within a given time becomes high. Unconventional methods for the handling and storage of fibers must therefore be devised. While glass and silica (the materials used to make optical fibers) and in some respects stronger than steel, fibers normally do not possess this potential strength because of microscopic surface fractures which are vulnerable to stress and spread, causing the fiber to break easily. Thus the take-up of fiber slack (a bight in a fiber) in a closure presents a problem for multi-fiber cables, where individual fiber splices are required to facilitate rearrangements and repairs. Another problem is that of identifying individual fibers. In large multi-fiber cables each fiber must be readily identifiable for subsequent testing and repairs. Unlike copper where the insulation may be colour coded, coding is difficult with individual optical fibers.

In an attempt to mitigate these problems, a standard splice enclosure with a central transverse bulkhead has been used. The individual fibers are spliced and are attached to the bulkhead for support. A disadvantage of this approach is that storage of slack in the fibers is not provided for. Furthermore, each of the fibers must be individually tagged for identification purposes.

Another approach used a ribbon type optical fiber arrangement where twelve fibers are fixed together side by side. Twelve of these ribbons are then stacked one on top of another to obtain a cable containing 144 individual fibers. The fibers are bulk spliced using an epoxy technique and the cable is placed in a standard splice enclosure. Disadvantages of the above approach are the lack of access to individual fibers and, again, no slack storage. A single fiber failure is impossible to repair, and the fiber must be taken out of service.

In other splicing arrangements all the fibers in a cable are looped within the same retainer or fiber slack is stored on spools. In either case identification, repair or splice work of individual fibers is extremely difficult without a major shuffle in the splice enclosure. This is undesirable as transmission capability can be affected in working fibers as they are moved.

U.S. Pat. No. 4,266,853 describes an organizing device for optical fibers which comprises a plurality of stacked tray-like supports having partially turned-up edges, with each separately hinged at one side thereof to a carrier. Each tray-like support is adapted to retain a looped fiber portion, and has a width at least equal to twice the minimum bending radius specified for that fiber.

Fiber optic communications cables generally include some form of strength member to carry the strain involved in installing the cables in ducts or laying them underwater, since the fibers are not capable of bearing such strains themselves. When two fiber optic cables are jointed there should, therefore, be means provided at the joint to transfer the strain from one cable strength member to the other cable strength member.

DESCRIPTION OF THE INVENTION

Summary of the Invention

According to one aspect of this invention there is provided a device and method for organizing a bight in an optical fiber so as to both minimize the diameter of a container necessary to enclosure that bight and maximize the radius through which such fiber is bent, which method comprises wrapping said bight about a cylindrical core to form a helix or a pair of helices of opposite handedness.

According to another aspect of this invention there is provided a device and method for joining two fiber optic cables each containing at least one optical fiber and a strength member so as to both minimize the diameter of the joint and maximize the radius through which each fiber is bent while still allowing sufficient slack for easy joining of the fibers.

According to a further aspect of this invention there is provided a device and method for organizing optical fibers at a splice or slack point so as to render them capable of easy identification and access while both minimizing the diameter of a container necessary to enclose such fibers and maximizing the radius through which each such fiber is bent.

According to yet another aspect of this invention there is provided a device and method for the ready encapsulation of optical fibers at a splice or slack point.

BRIEF DESCRIPTION OF THE DRAWING

FIG. 1 shows in perspective an embodiment of the fiber optic slice organizer of this invention.

FIG. 2 shows in perspective the device of FIG. 1 in use.

FIG. 3 is a cross-sectional view through a joint between fiber optic cables in accordance with an embodiment of this invention.

FIGS. 4 through 6 are cut-away perspective views of joints between fiber optic cables having different numbers of fibers, showing embodiments of the organizer of this invention.

DETAILED DESCRIPTION OF THE INVENTION

In its simplest form, this invention comprises the helical wrapping of an optical fiber about a cylindrical core of a radius which may be less than the minimum bending radius of the fiber such that the bend radius of the fiber is greater than its minimum bending radius while the length of the fiber taken up on the core is greater than the core length.

Mathematically expressed, if the core is of length l and radius r, and a fiber is wrapped helically on it with a helical (pitch) angle $\theta$ (the symbols being shown in FIG. 1), the bend radius of the fiber, $r'$, is given by:

$$r' = r/\cos\theta$$

while the length of the fiber stored, $l'$, is given by:

$$l' = l/\sin\theta$$

It is evident from the above that the bend radius of the stored fiber is maximized (i.e. the probability of fiber breakage is minimized) when, for a given r, $\theta$ is large; while the length of fiber stored is maximized when, for a given l, $\theta$ is small. The length and maximum external radius of a splice are generally determined by external considerations, particularly when, as is usual, it is desired to use standard splice products, so that it becomes a matter of calculation, etc. within the level of one skilled in the art in view of this disclosure to determine a suitable core radius and helical angle for a particular set of circumstances.

A preferred embodiment of this invention, in which the helical wrapping comprises a wrapping to form a pair of helices of opposite handedness, is illustrated in FIGS. 1 through 3.

In FIG. 1, a fiber-optic cable shown generally at 10 has an optical fiber 12, while a similar cable shown generally at 14 has an optical fiber 16, with fibers 12 and 16 being spliced or connected at 18 by any suitable method. A cylindrical core 20, having tapering ends 22 and 24, is placed generally parallel to cables 10 and 14 so that its ends abut the ends of the cables. A sheet 26, shown in FIG. 1 as comprising two laminae, is attached by one edge 28 to the core, and the spliced fiber 12-18-16 laid out on that sheet in such a fashion that, when the sheet is rolled about the core, the fiber will trace a pair of helices of opposite handedness intersecting at 18.

The material of the sheet may be slightly adhesive to facilitate handling of the optical fiber on the sheet and may comprise, for example, a polymeric foam to provide cushioning for the fiber. A suitable thickness for such a foam sheet may be, e.g., 0.3–1.0 mm and the sheet may, if desired, have a thinner portion to accommodate the fiber connection. Guides to aid the placement of the fiber(s) may be provided on the sheet, such as at 30, accommodating different bight lengths, while indicia 32 may be placed on the sheet or the sheet colored over at least a part of its surface to identify the fiber(s) associated therewith. The sheet may be transparent to enable visualization of the (wrapped) fiber(s).

The sheet may, if of a suitable thickness, be provided with grooves to receive the fiber(s). In cases where encapsulation of the fibers (covering with a waterexcluding jelly, sealant, or the like) is desired, the use of a sheet comprising two laminae is especially valuable. The two laminae are joined along lines 30 forming a tube, and one lamina is cut so as to slit open the tube. The spliced fiber may then be placed into the tube through the cut, and the cut closed, e.g. by the use of a line of adhesive tape over the cut. The tube may then be filled with the encapsulating material, which may be "massaged" along the tube to completely fill it and exclude air. Alternatively, the sheet may be coated with the encapsulating material. More than one tube may be formed in a sheet, if desired.

The core 20 may be made of any suitable material, for example, metal or rigid plastic, and may have a cushioning layer on its outer surface. The taper of regions 22 and 24 is of such a shape that the fiber does not undergo a bend of radius less that the minimum bending radius.

The use of the term "cylindrical" to describe the core is not intended to limit the cross-section to being circular. However, it should be noted that a circular crosssection affords the maximum bending radius for a given transverse dimension, and is thus generally preferred. The core need not be solid, nor indeed unitary, and split, composite, and/or hollow cores may be preferred for ease of use. A split core, for example, may be fitted over the joined strength members of two fiber-optic cables for use.

FIG. 2 depicts the embodiment of FIG. 1 after the sheet 26 has been rolled about the core 20, and the fiber is seen to form a pair of helices of opposite handedness. By this means, the bight in the fiber 12-18-16 has been reduced so as to both maximize its bend radius and minimize the diameter of a container necessary to enclose it.

The assembly of FIG. 2 may then be enclosed by any means considered desirable, such as the use of a conventional telecommunication cable splice case and/or a recoverable polymeric sleeve, such as are well-known in the art.

A recoverable sleeve may be tubular or be a wraparound, such as for example the product described in U.S. Pat. No. 3,455,336, and may be heat-recoverable. A heat-recoverable sleeve may be externally heated, such as with a gas torch, or may contain integral heating means, such as for example those described in U.S. Pat. Nos. 4,177,446 and 4,223,209. These three patents are incorporated herein by reference.

While FIGS. 1 and 2 illustrate but a single fiber and sheet, it will be readily apparent that more than one fiber may be placed upon a sheet and/or more than one sheet may be attached to the core so that a plurality of fibers may be organized. The use of multiple sheets offers the advantage that individual fibers may be conveniently accessed with minimum disturbance to other fibers, and identifying indicia may be placed on the sheets to simplify fiber identification. Further, a plurality of cores may be used, especially when the number of fibers to be organized is large.

The use of a sheet 26 is not an essential factor of this invention, though certainly a preferred one, and the fiber bight may be wrapped directly on the core 20 if so desired. It will generally be necessary in such a case to secure the fiber to the core before enclosing the assembly, and this may be accomplished by any suitable means.

FIG. 3 is a cutaway view through a joint between two cables in accordance with this invention. Here, a first cable shown generally at 10 comprises an outer jacket 34, fiber layer 36, and strength member 38 (such as a wire rod), while a second cable shown generally at 14 comprises jacket 40, fiber layer 42, and strength member 44. To make the joint, strength members 38 and 44 are joined by a coupling 46 and the core 20, having tapered ends 22 and 24, is emplaced over the joined strength members. Fibers 12 and 16 are joined and, as in FIG. 1, laid on sheet 26, and sheet 26 is wrapped around the core 20 as in FIG. 2.

A protective liner 48 is placed over the splice assembly, and the whole covered by a recoverable polymeric sleeve 50. Particular advantages of the method include (i) the ability to easily join the strength members to form a rigid joint, (ii) the ability to use components similar or identical to those used for conventional telecommunications cable joints, and (iii) the small size of the resulting joint while still allowing a sufficient bight in the optical fibers for convenient connection.

FIGS. 4 through 6 are cut-away perspective views of splices between fiber optic cables organized in accordance with an embodiment of this invention.

In FIG. 4, a single sheet 54 has been wrapped about core 52, and the organized splice enclosed by a wrap-around cover 56 closed by closure 58. Such a single sheet organizer is believed suitable for organizing 1-24 fibers within a splice of diameter about 50 mm.

FIG. 5 shows the use of four sheets 54 wrapped about the core 52 and enclosed in a manner similar to that of FIG. 4. Such an organizer is believed suitable for organizing up to about 48 fibers within a splice of diameter about 80 mm.

FIG. 6 shows the use of seven cores 52, each wrapped with four sheets 54, and enclosed in a manner also similar to that of FIG. 4. Such an organizer is believed suitable for organizing up to about 336 fibers within a splice of diameter about 240 mm.

A slack point may be taken up in the same way as has been illustrated here for a splice and this offers the ability to create easy access points to a fiber optic cable.

A single helical winding, as discussed previously, may also be used, but disadvantages of the single helix include the inability to locate the core in its final position before making the wrapping, and the fact that all fibers will generally require to be manipulated simultaneously. Under some circumstances, these disadvantages may not be significant, however, and the single helic technique may prove useful.

The use of more than a pair of helices is also possible, but since each change of handedness decreases the storing efficiency of the fiber, l'/l, an increase in the number of changes of handedness is not generally advantageous.

While this invention has been described in detail with respect to certain preferred embodiments thereof it is evident that there may be a number of changes, adaptations, and modifications which come within the province of those skilled in the art. However, it is intended that all such variations not departing from the spirit of this invention should be considered within the scope thereof, as limited solely by the appended claims, in which the singular includes the plural unless the context requires otherwise, and their reasonable equivalents.

We claim:

1. A device for helically wrapping an optical fiber about a cylindrical core, comprising:
    (a) a cylindrical core having a radius of which is less than the minimum bending radius of said fiber
    (b) a sheet of flexible material, which sheet is attached longitudinally to said core along one edge of the sheet, and is wrapped around said cylindrical core, said optical fiber being arranged on said sheet such that when said sheet is wrapped about said core a minimum helical pitch angle, $\theta$, of said fiber is determined from $r' = r/\cos\theta$ where $r'$ is the minimum bending radius of the fiber and r is the radius of the core.

2. The device of claim 1 wherein said core is tapered at at least one end thereof.

3. The device of claim 1 wherein said sheet possesses indicia thereon to identify said fiber associated therewith.

4. The device of claim 1 wherein said sheet possesses guide lines thereon to aid the arrangement of said fiber thereon.

5. The device of claim 1 wherein a plurality of sheets are attached to said core.

6. The device of claim 1 wherein said sheet comprises a plurality of laminae.

7. The device of claim 6 wherein at least one pair of said laminae are fused to form a tube for receiving said fiber therein.

8. An optical fiber organizer kit having component parts capable of being assembled for organizing a bight in an optical fiber between two points, the kit comprising the combination of:
    (a) a cylindrical core having a length adapted to be inserted on an axis between said two points and having a radius which is less than the minimum bending radius of said fiber; and
    (b) a sheet of flexible material adapted to have said optical fiber arranged thereon and to be wrapped about said core, said sheet being wrapped around said core, said optical fiber being arranged on said sheet such that when said sheet is wrapped about said core a minimum helical pitch angle, $\theta$, of said fiber is determined from $r' = r/\cos\theta$ where $r'$ is the minimum bending radius of the fiber and r is the radius of the core.

9. A fiber optic cable joint kit having component parts capable of being assembled for forming a joint between two fiber optic cables, said cables each comprising an optical fiber surrounded by an outer jacket wherein a portion of the outer jacket is removed to expose said fiber, the kit comprising the combination of:
    (a) a cylindrical core having a length adapted to be placed between the ends of the jacketed portions of said cables and having a radius which is less than the minimum bending radius of said fiber;
    (b) a sheet of flexible material adapted to have said optical fiber arranged thereon when said fiber has been joined to be wrapped about said core, said sheet being wrapped around said cylindrical core, said optical fiber being arranged on said sheet such that when said sheet is wrapped about said core a minimum helical pitch angle, $\theta$, of said fiber is determined from $r' = r/\cos\theta$ where $r'$ is the minimum bending radius of the fiber and r is the radius of the core; and
    (c) covering means for covering said joint when said sheet has been wrapped about said core.

10. The kit of claim 9 wherein the covering means comprises a heat-recoverable polymeric sleeve.

11. The kit of claim 10 wherein the heat-recoverable sleeve comprises an integral electrical heating means.

12. A joint between two fiber optic cables, each cable comprising an optical fiber and said optical fibers having been jointed to form a bight, wherein said bight has been organized by being helically wrapped about a cylindrical core positioned generally parallel to the axis between said two cables and having a radius which is less than the minimum bending radius of said fiber, said bight being helically wrapped about said core in such a manner that a minimum helical pitch angle, $\theta$, of said bight is determined by $r' = r/\cos\theta$ where $r'$ is the minimum bending radius of the fiber and r is the radius of the core.

13. A method of organizing a bight between two points in an optical fiber, which method comprises helically wrapping said bight about a cylindrical core positioned generally parallel to an axis between said two points wherein the radius of said core is less than the minimum bending radius of said fiber and wherein a minimum helical angle, $\theta$, of said bight is determined from $r' = r/\cos \theta$ where $r'$ is the minimum bending radius of the fiber and $r$ is the radius of the core.

14. The method of claim 13 wherein said helical wrapping comprises forming a pair of helices of opposite handedness.

15. The method of claim 13 wherein more than one fiber is organized.

16. The method of claim 13 which further comprises encapsulating said fiber.

17. The method of claim 13 wherein said helical wrapping comprises the steps of:
   (a) arranging said fiber on a sheet such that said fiber will become helically wrapped about said core when said sheet is wrapped about said core; and
   (b) wrapping said sheet about said core.

18. The method of claim 17 wherein said helical wrapping comprises forming a pair of helices of opposite handedness.

19. The method of claim 17 wherein said sheet is provided with indicia to identify at least one of said fiber arranged thereon.

20. The method of claim 17 which further comprises encapsulating said fiber.

21. The method of claim 17 wherein said sheet comprises a plurality of laminae, and said fiber is placed between a pair of said laminae.

22. The method of claim 21 which further comprises encapsulating said fiber by an encapsulant introduced between said pair of laminae.

23. The method of claim 17 wherein more than one fiber is organized.

24. The method of claim 23 wherein more than one sheet is employed.

25. The method of claim 24 wherein more than one fiber is arranged on at least one of said sheets.

26. A method of making a joint between two fiber optic cables, each cable comprising an optical fiber, which method comprises:
   (a) joining said optical fibers, thereby forming a bight;
   (b) providing a cylindrical core for organizing said bight wherein a radius of said core is less than the minimum bending radius of said fiber;
   (c) helically wrapping said bight about said cylindrical core; and
   (d) determining a minimum helical angle, $\theta$, from $r' = r/\cos \theta$ where $r'$ is the minimum bending radius of the fiber and $r$ is the radius of the core.

27. The method of claim 26 which further comprises covering said joint with a covering means.

28. The method of claim 27 wherein the covering means comprises a heat-recoverable polymeric sleeve.

29. The method of claim 28 wherein the heat-recoverable sleeve comprises integral electrical heating means.

* * * * *